(12) United States Patent
Jitsukawa (10) Patent No.: US 6,822,843 B2
(45) Date of Patent: Nov. 23, 2004

(54) EXTERNAL STORAGE DEVICE AND ENTERTAINMENT SYSTEM INCORPORATING THE SAME

(75) Inventor: Keiji Jitsukawa, Chiba (JP)

(73) Assignee: Sony Computer Entertainment Inc. (JP)

(*) Notice: Subject to any disclaimer, the term of this patent is extended or adjusted under 35 U.S.C. 154(b) by 162 days.

(21) Appl. No.: 10/078,893

(22) Filed: Feb. 19, 2002

(65) Prior Publication Data

US 2002/0121813 A1 Sep. 5, 2002

(30) Foreign Application Priority Data

Feb. 20, 2001 (JP) .......................... 2001-043478
Feb. 15, 2002 (JP) .......................... 2002-038574

(51) Int. Cl.[7] ................................. H02H 9/00
(52) U.S. Cl. ................... 361/118; 361/115; 361/127
(58) Field of Search ................. 361/58, 91.1, 115, 361/118, 120, 127, 683

(56) References Cited

U.S. PATENT DOCUMENTS

| | | | |
|---|---|---|---|
| 5,381,043 A | * | 1/1995 | Kohiyama et al. .......... 307/116 |
| 5,625,777 A | | 4/1997 | Takahashi et al. |
| 5,859,968 A | | 1/1999 | Brown et al. |
| 5,905,888 A | | 5/1999 | Jones et al. |
| 6,456,494 B1 | * | 9/2002 | Tagawa et al. ............. 361/724 |

FOREIGN PATENT DOCUMENTS

| | | |
|---|---|---|
| JP | 05-143241 A1 | 6/1993 |
| JP | 10-214248 A1 | 8/1998 |
| JP | 11-275516 A | 10/1999 |
| JP | 2000-242604 A | 9/2000 |
| WO | WO 00/56068 A1 | 9/2000 |

* cited by examiner

Primary Examiner—Stephen W. Jackson
(74) Attorney, Agent, or Firm—Lerner, David, Littenberg, Krumholz & Mentlik, LLP (57) ABSTRACT

An external storage device connected to electronic equipment through a cable includes a switch for selecting functions of the main unit of the external storage device. A user freely sets the function of the external storage device by simply operating the switch. This arrangement eliminates the need for disassembling the external storage device to switch the function thereof. The switch may be externally exposed out of the case of the external storage device.

21 Claims, 6 Drawing Sheets

EXTERNAL STORAGE DEVICE AND ENTERTAINMENT SYSTEM INCORPORATING THE SAME

FIELD OF THE INVENTION

The present invention relates to an external storage device connected to electronic equipment through a cable and an entertainment system including the external storage device.

BACKGROUND OF THE INVENTION

In electronic equipment such as a personal computer or an entertainment device, an external hard disk drive is employed. The external hard disk drive typically has the same structure as that of a hard disk drive internally mounted in the electronic equipment. The main unit of the hard disk drive is covered with a metal sheet to control EMI (Electromagnetic Interference), and is then housed in a case fabricated of a resin. The external hard disk drive is connected to the electronic equipment such as a computer through a cable compatible with the SCSI (Small Computer System Interface) standards, and is thus used as a storage device for the electronic equipment.

Such an external hard disk drive and the main unit of a hard disk drive internally mounted in the electronic equipment are set up for a variety of functions in accordance with the specifications of the electronic equipment and the standards applicable thereto. Specifically, the hard disk drive is set up for an intended function by electrically shorting a plurality of jumper pins exposed from the end face of the hard disk drive main unit.

In setting an intended function of the main unit of the external hard disk drive to make it compatible with intended electronic equipment, the external hard disk drive must be opened (or disassembled) to short jumper pins in the hard disk drive main unit with a connector. This step makes a setup procedure troublesome.

It may be contemplated that jumper pins are exposed externally. However, if a surge current due to static flows into a disk as a storage area, the storage function of the hard disk drive may be adversely affected.

SUMMARY OF THE INVENTION

Accordingly, it is an object of the present invention to provide an external storage device which is connected to electronic equipment through a cable and is easily set up for a function of the main unit of the external storage device.

An external storage device of the present invention in one aspect is connected to electronic equipment through a cable, and includes a storage device main unit and a switching unit for selecting functions of the storage device main unit.

An entertainment system of the present invention in another aspect includes an entertainment device, and an external storage device connected to the entertainment device through a cable, wherein the external storage device includes a storage device main unit and a switching unit for selecting functions of the storage device main unit.

The storage device main unit is set up for functions by shorting jumper pins (or by connecting jumper pins with each other). The functions to be set include (1) a master-slave selection function for selecting whether the storage main unit works in a master boot mode or in a slave boot mode, (2) a cable selection function for selecting a mast boot mode or a slave boot mode depending on the position of an external storage device in a line when a plurality of storage device main units is connected in a cascade connection through a series of cables, (3) a storage capacity setting function to forcibly set the storage capacity of the storage device main unit to a predetermined size, and (4) a standby selection function for selecting whether the startup mode (i.e., the mode of when the electronic equipment (an entertainment device) is switched on) of the storage device is a standby mode or not.

In a preferred embodiment of the present invention, a switch is externally exposed out of a case of the storage device main unit. The user thus can freely set the function of the external storage device by simply operating the switch. This arrangement eliminates a troublesome step for setting the function of the storage device, such as opening (or disassembling) the case of the storage device. Since jumper pins are not externally exposed out of the storage main unit, its function is changed without any adverse effect such as static charge on the storage main unit.

The above-mentioned switch preferably switches the mode of the storage main unit between a master boot mode and a slave boot mode. When a plurality of storage devices is connected to the electronic equipment (the entertainment device), it is necessary to select one storage device to retrieve information therefrom at the startup. By enabling selection between the mater boot mode and the slave boot mode, the mater-slave setting is flexibly performed. In the electronic equipment such as the entertainment device having no internal storage device, an external storage device must work in the master boot mode. The switch is very useful in such a case.

An interface of the storage device with the electronic equipment is preferably compliant with the ATA (AT Attachment) standards. The interfaces between the external storage device and the electronic equipment are conventionally compliant with the SCSI (Small Computer System Interface) standards, the IEEE (Institute of Electrical and Electronic Engineers) standards, etc. The ATA standards have been applied to the dedicated internal components. In accordance with the conventional SCSI standards, a signal input through an SCSI cable from the electronic equipment is converted into a signal compatible with the ATA standards by an IC (Integrated Circuit) in the external storage device and is then fed into the storage device main unit. With an ATA-compliant interface, a signal is directly communicated between the electronic equipment and the external storage device without being converted by an IC. The number of the component of the external storage device is thus minimized, and the manufacturing cost of the external storage device is reduced.

The switch and the storage device main unit are preferably connected to each other with a surge protection circuit connected therebetween. The surge protection circuit includes a varistor connected between a switching line for an on/off operation of the switch and a ground line. With such a surge protection circuit, a surge current drains to ground through the varistor when the surge current due to a static, which occurs by operating the switch, flows into the switching line. The storage device main unit is thus reliably prevented from being affected by the surge current.

DETAILED DESCRIPTION OF THE PREFERRED EMBODIMENTS

One embodiment of the present invention is discussed below referring to the drawings.

Figure 1:
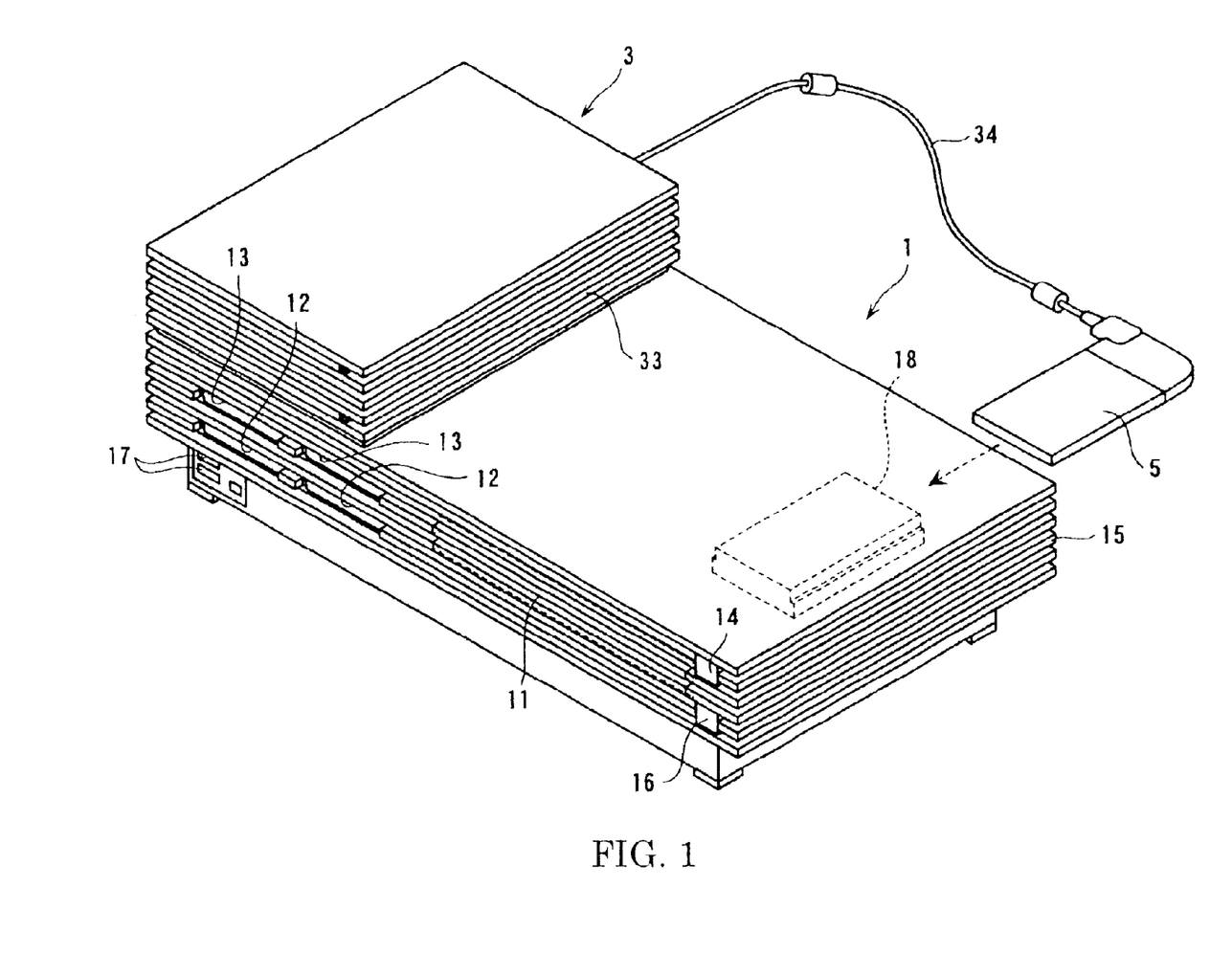
FIG. 1 is a perspective view illustrating electronic equipment and an external storage device in accordance with one embodiment of the present invention.

FIG. 1 illustrates an entertainment device 1 as an electronic equipment in accordance with the one embodiment of the present invention. The entertainment device 1 is connected to an external hard disk drive 3 as an external storage device. Although not shown in FIG. 1, an output from the entertainment device 1 is connected to a display such as of a television receiver or a stereo set (audio equipment).

The entertainment device 1 has the function of reading a game playing program from an optical disk and performing a game in response to an instruction from a user, and the function of replaying a video or music from the optical disk. The entertainment device 1 includes a disk device 11, a CPU (Central Processing Unit) (not shown), a controller slot 12, a memory slot 13, and a power switch 14. These units are housed in a case 15.

The disk device 11 replays a game program from the optical disk and sends a corresponding signal to the CPU. The front end of a disk tray into which the optical disk is loaded is exposed on the front face of the case 15. When a control switch 16 adjacent to the tray is operated, the disk tray is projected out of the case 15, thereby being ready to receive the optical disk therewithin.

A controller is connected to the controller slot 12 via a cable and a connector. By operating the controller, a user performs game playing. A memory card is inserted into a memory slot. The user operates the controller, thereby recording the progress of a game in the memory card. The user can later resume the game by retrieving the information stored in the memory card.

A power switch 14 is a drive switch of the entertainment device 1. It becomes possible to carry out the game playing by operating the power switch 14. The power switch 14 also functions as a reset switch. A master switch is arranged on the rear surface of the entertainment device 1. By operating the master switch, power to the entertainment device 1 is cut off.

The CPU generally controls the entertainment device 1. The CPU controls the internal disk device 11, and a video processor and a sound system connected to the CPU. The CPU also controls writing information on or reading information from an external hard disk drive 3 connected to the entertainment device 1. Furthermore, the CPU processes a control signal input from the controller and makes the results of the control signal output as video information and audio information respectively from the video processor and the sound system.

The entertainment device 1 includes on the front side thereof an USB (Universal Serial Bus)-compliant connection terminal 17 for connection with an external device, and a PCMCIA (Personal Computer Memory Card International Association)-compliant slot (PCMCIA slot) 18. A PC card 5 is mated with the PCMCIA slot 18. The entertainment device 1 is thus connected to the external hard disk drive 3 through a cable 34 connected to the PC card 5.

Figure 2:
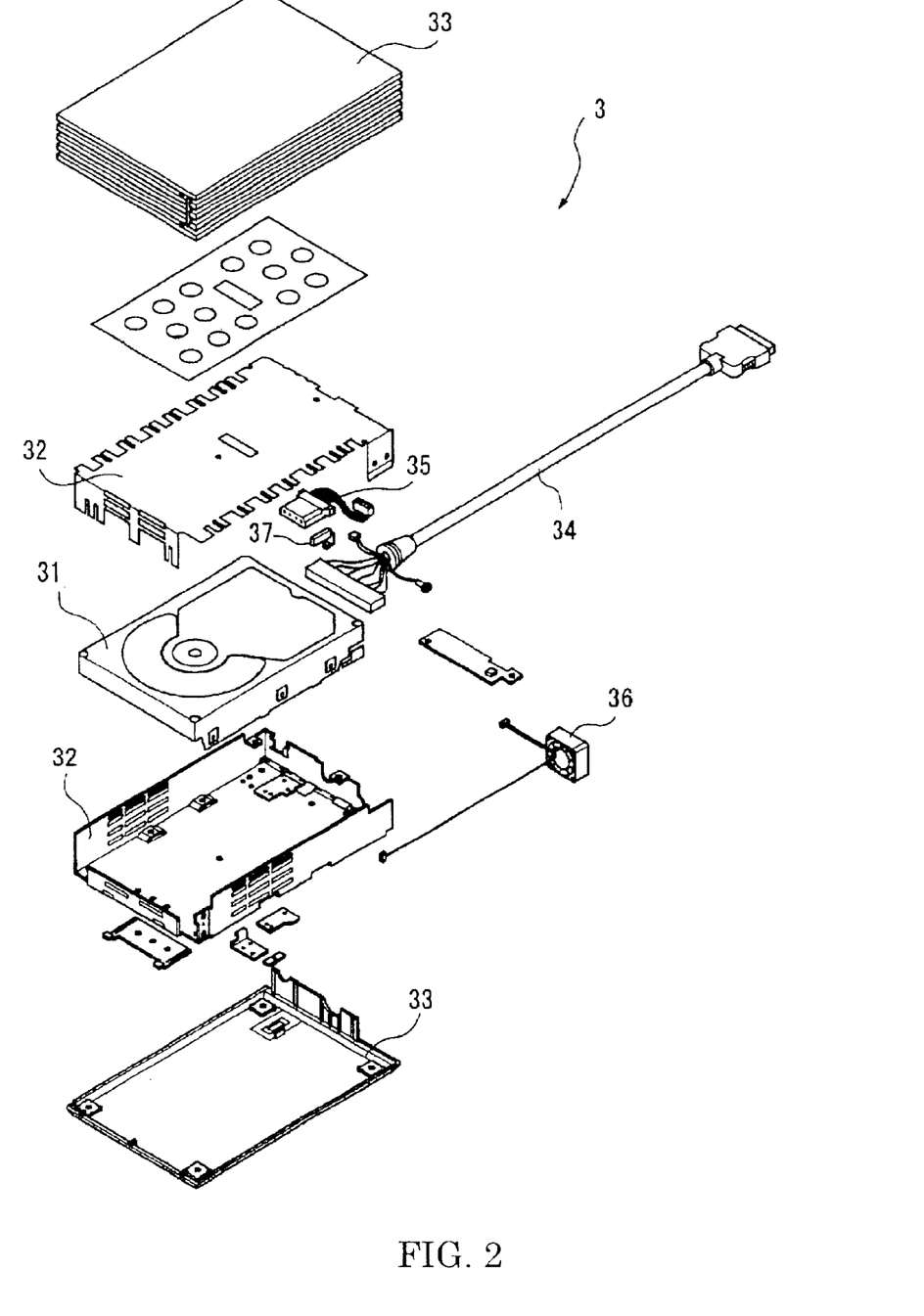
FIG. 2 is an exploded perspective view illustrating the structure of the external storage device of the present embodiment.

The external hard disk drive 3 stores the progress of a game performed by the entertainment device 1 and stores a software program such as of a game playing software program downloaded from a server when the entertainment device 1 is linked with the Internet. Referring to FIG. 2, the external hard disk drive 3 includes a hard disk drive main unit 31, a metal shielding case 32 covering the hard disk drive 31, an external case 33 fabricated of a synthetic resin for housing together the hard disk drive main unit 31 and the metal shielding case 32, and the cable 34 connected to the hard disk drive 31 on the rear side of the external case 33. A power cable 35 is connected to the rear side of the hard disk drive main unit 31. A cooling fan 36 is arranged beside the cable 34.

As shown in FIG. 2, the cable 34 of the external hard disk drive 3 has on the side of the PC card 5 a first connector which is not correspondent with the connector of the PC card 5. The first connector is connected to a second connector (not shown) correspondent with the connector of the PC card 5 and then connected via this second connector to the PC card 5. By inserting the PC card 5 to the PCMCIA slot 18 of the entertainment device 1, connecting one end of the cable 34 to the PC card 5 via the first and second connector, and connecting the other end of the cable 34 to the hard disk drive 3, the hard disk drive 3 and the entertainment device 1 are connected with each other. Alternatively, the PC card 5 may have other type of a connector which matches with the first connector of the cable 34.

Figure 3:
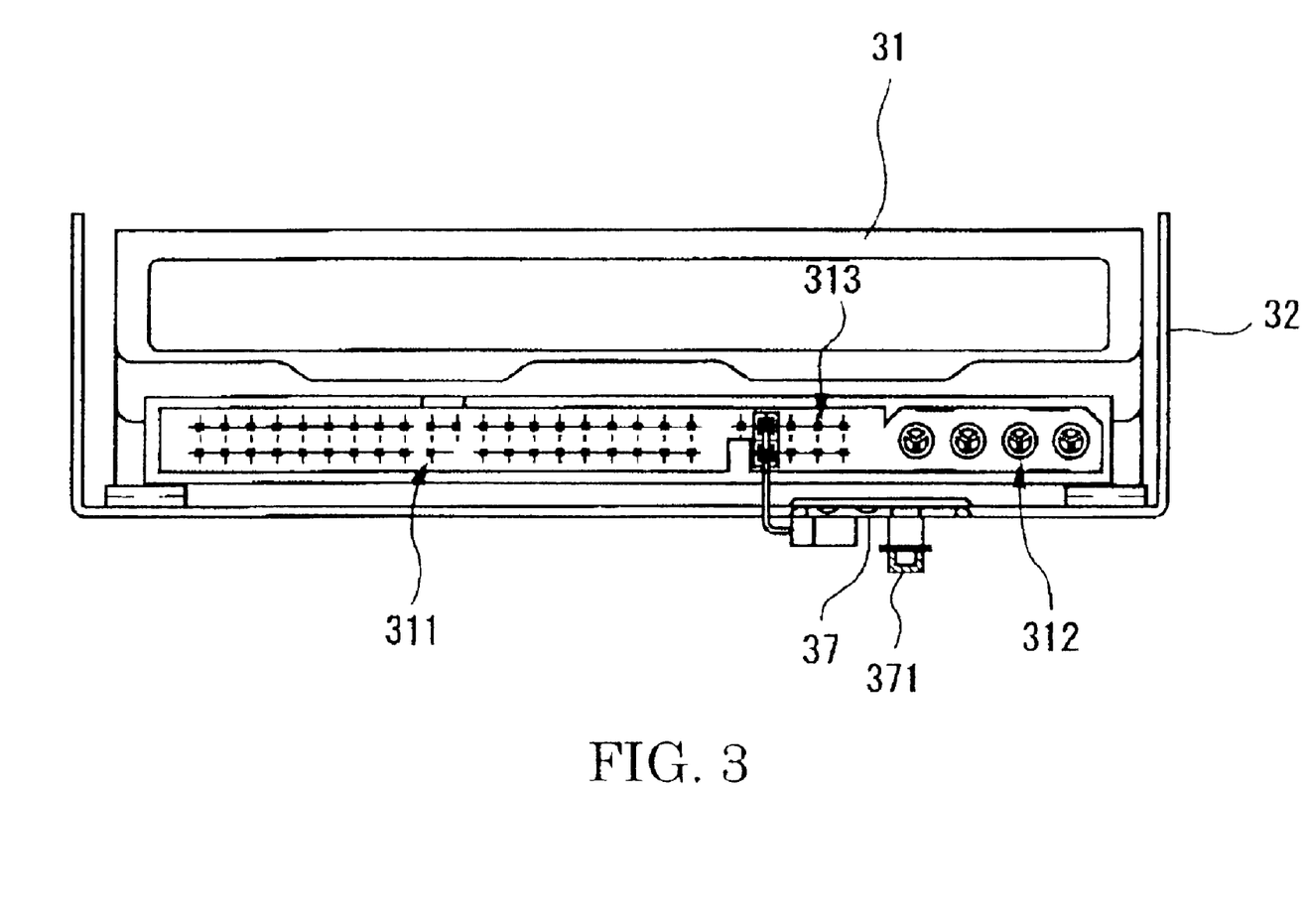
FIG. 3 is a back view illustrating the main unit of the external storage device of the present embodiment.

The hard disk drive main unit 31 has a structure identical to that of an internal hard disk drive mounted in a computer. Referring to FIG. 3, the hard disk drive main unit 31 has on the rear side thereof signal connection terminal 311 which is compliant with (or conformed to) the ATA (AT (Advanced Technology) Attachment) standards, and power supply terminals 312. Nine jumper pins 313 are arranged between the terminals 311 and 312 on the rear side of the hard disk drive main unit 31. By shorting (or connecting) at least predetermined two of the nine jumper pins with a connector (or a jumper block), the hard disk drive main unit 31 is set for a predetermined function.

Figure 4:
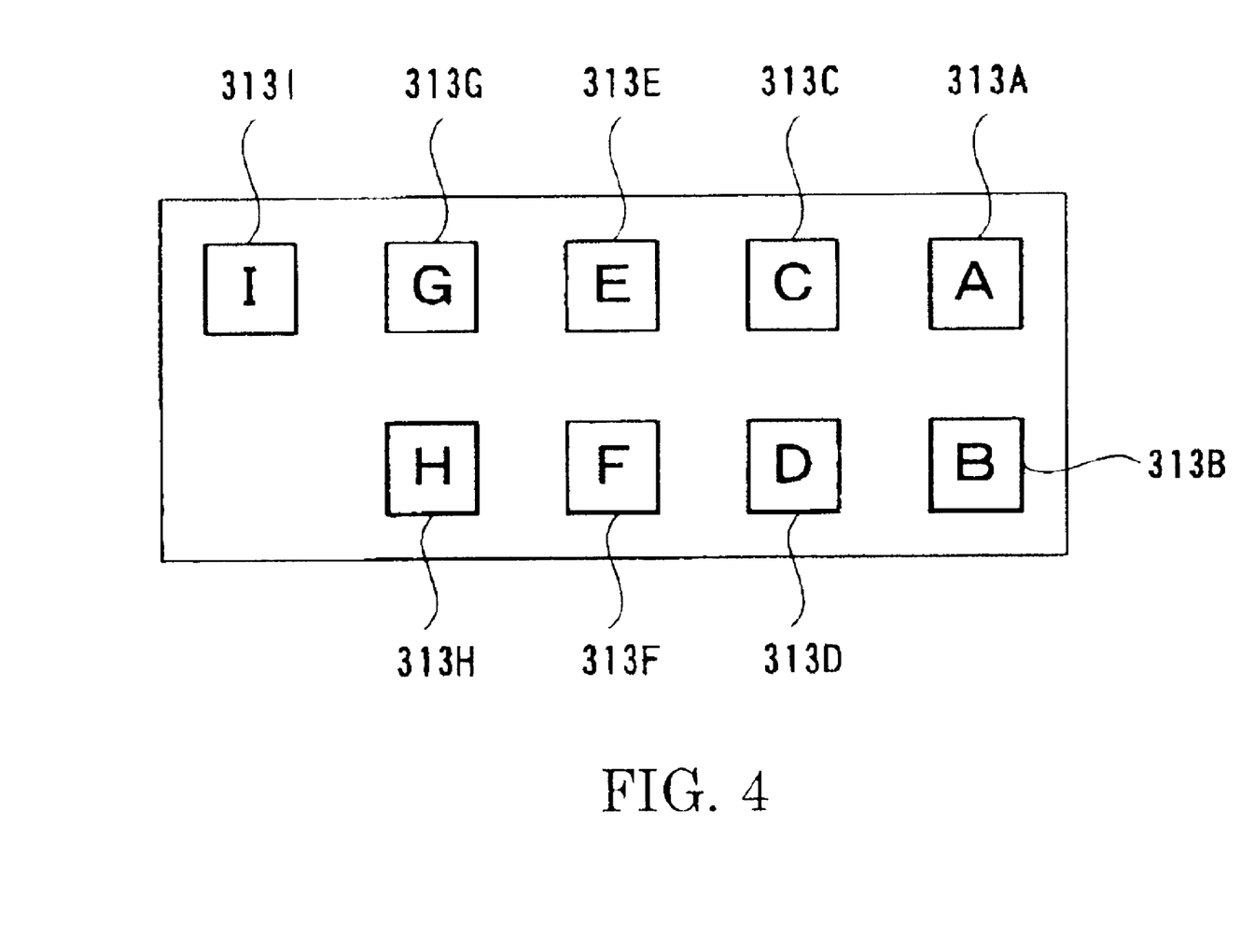
FIG. 4 is a diagram illustrating the layout of jumper pins in the storage device main unit.

The hard disk drive main unit 31 is set up for one of a variety of functions depending on a combination of the jumper pins 313 to be shorted. Specifically, if a jumper pin 313G is connected to a jumper pin 313H in the arrangement of the nine jumper pins 313A–313I of this embodiment as shown in FIG. 4, the hard disk drive main unit 31 is set up as a master boot storage device. In this case, the CPU first reads information recorded onto the external hard disk drive 3 when the entertainment device 1 is switched on. When the jumper pin 313G and the jumper pin 313H are not shorted, the hard disk drive main unit 31 is set up as a slave boot storage device. In this case, when the entertainment device 1 is switched on, the CPU does not read information stored in the external hard disk drive 3.

When the jumper pins 313E and 313F are shorted to each other, the hard disk drive main unit 31 is provided with the cable selection function. Specifically, when a plurality of hard disk drives is connected in a cascade connection using a series of ATA-compliant cables, a hard disk drive arranged farthest from a mother board of the computer is recognized as a master boot disk while a hard disk drive arranged next farthest from the mother board of the computer is recognized as a slave boot disk in the cable selection function.

When the jumper pins 313B and 313D are shorted to each other, the storage capacity of the hard disk drive main unit 31 is limited. For example, a hard disk drive main unit 31 originally having a capacity of 32 GB (giga-byte) which may be limited to a storage capacity of 2 GB by the capacity limiting function. This function is provided to make the hard disk drive main unit 31 be compatible with old computers which may be typically subject to an upper limit of 2 GB in the storage capacity thereof. By setting the upper limit of the storage capacity to 2 GB, even such an old type computer can work with the external hard disk drive 3.

When the jumper pins 313B and 313D are shorted to each other and the jumper pins 313A and 313C are shorted to each other, the hard disk drive main unit 31 starts up in a standby mode when the entertainment device 1 is switched on. The standby mode is set to save power when the entertainment device 1 is switched on. This mode is used particularly when the external hard disk drive 3 is set up as a slave boot device.

The jumper pins 313G and 313H, among the nine jumper pins 313A–313I, are electrically connected to a switching circuit module. Referring to FIG. 3, the circuit module includes a wire harness and a switching circuit board 37. The switching circuit board 37 is connected to the jumper pins 313G and 313H through the wire harness. A switching operation on the circuit module allows the hard disk drive main unit 31 to be switched at startup to the master boot mode or the slave boot mode. To allow a switching operation to activate another function, the wire harness is simply connected to jumper pins 313 corresponding to that function. The wire harness is provided with at least two sockets which are electrically connectable with at least two jumper pins 313.

Figure 5:
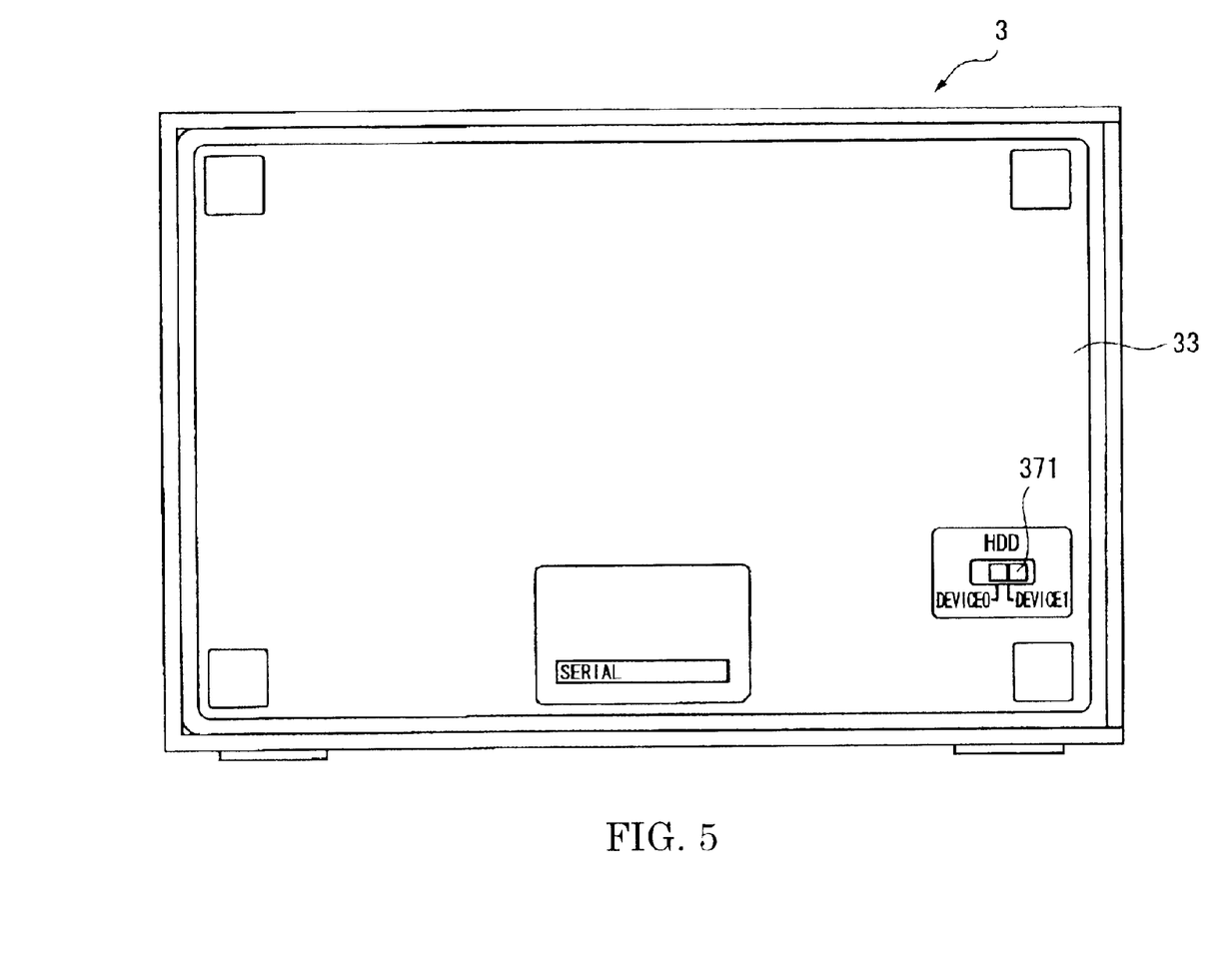
FIG. 5 is a bottom view of the external storage device of the present embodiment.

Referring to FIG. 3, the switching circuit board 37 is attached to the metal shielding case 32. A switching element 371 mounted on the switching circuit board 37 is projected out of the metal shielding case 32. Referring to FIG. 5, a control section of the switching element 371 is exposed to the bottom surface of the external case 33. By manipulating the control section, the user can turn on or off the switching element 371, thereby electrically connecting or disconnecting the jumper pins 313G and 313H. The external hard disk drive 3 is thus set up for a master boot mode or a slave boot mode. This operation is carried out without opening (or disassembling) the cases of external hard disk drive 3. As shown in FIG. 5, "DEVICE 0" indicates that the external hard disk drive 3 is set up as a master boot device, and "DEVICE 1" indicates that the external hard disk drive 3 is set up as a slave boot device.

Figure 6:
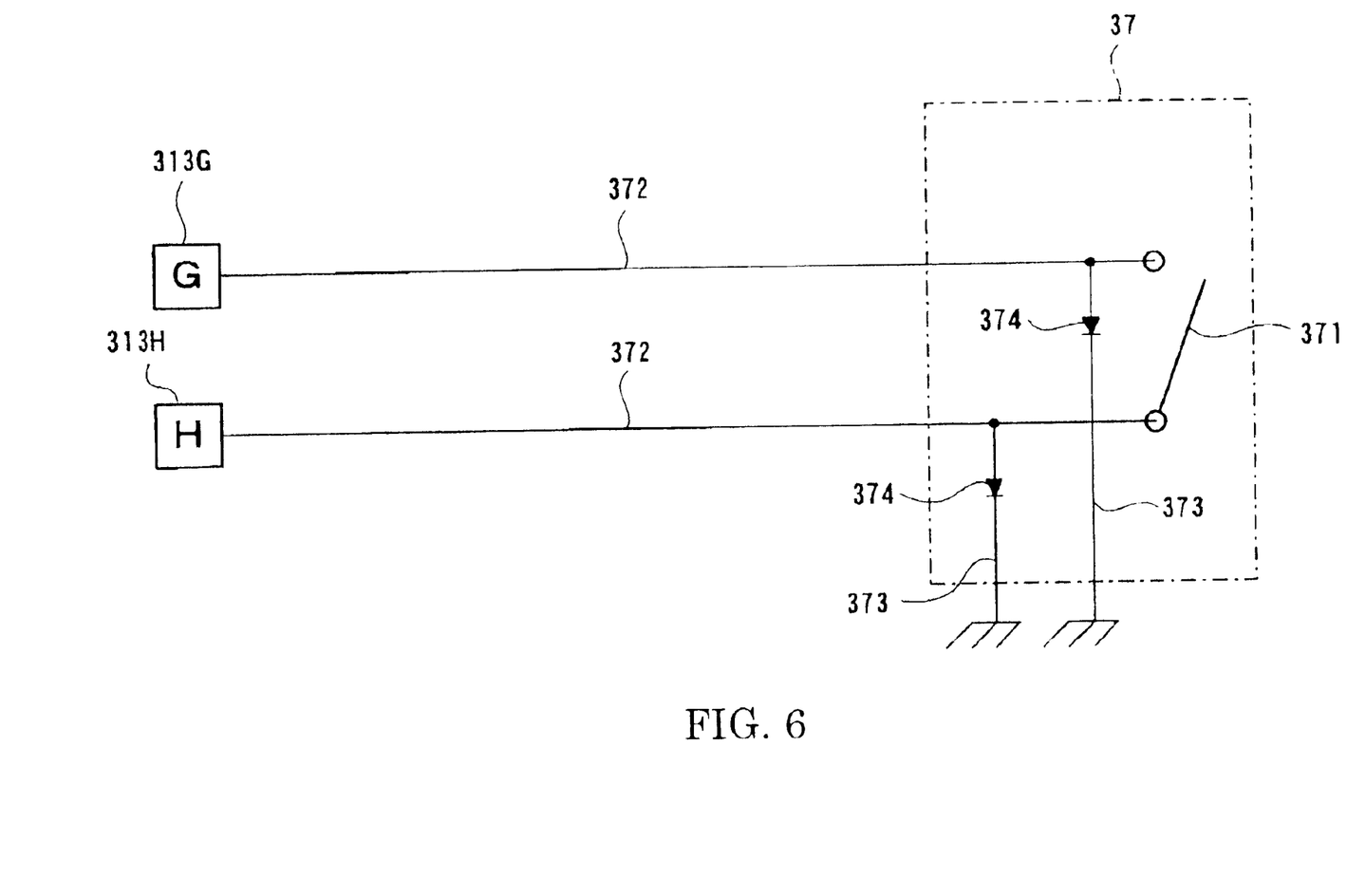
FIG. 6 is a circuit diagram illustrating a surge protection circuit connecting a switch to the jumper pins in the present embodiment of the present invention.

Referring to FIG. 6, the switching circuit including the jumper pins 313G, 313H and the switching circuit board 37 further includes the switching element 371, switching signal lines 372 connecting the jumper pins 313G and 313H and the switching element 371, ground lines 373 formed on the switching circuit board 37 on which the switching element 371 is mounted, and a varistor 374 connected between the switching signal lines 372 and the ground lines 373. The switching signal lines 372, the ground lines 373, and the varistors 374 form a surge protection circuit.

The varistor 374 is a non-linear resistance element that works depending on an applied voltage. The varistor 374 is a semiconductor element such as a diode. The ground lines 373 are formed of a metal line mounted on the switching circuit board 37, and are electrically connected to the metal shielding case 32 (i.e., the ground lines 373 are grounded to the metal shielding case 32). A surge current may flow in the switching element 371 in response to a static that may be generated when the user manipulates the switching element 371. The surge current is drained to the ground lines 373 through the varistors 374. This arrangement prevents the surge current from flowing into the hard disk drive main unit 31 through the switching signal lines 372 and the jumper pins 313G and 313H.

Referring to FIG. 1, the cable 34 is arranged with one end thereof connected to the signal connection terminal 311 of the hard disk drive main unit 31 and with the other end thereof connected to the PC card 5. Through the cable 34, the entertainment device 1 communicates with the external hard disk drive 3. The cable 34 complies with the ATA standards, and is directly connected to the hard disk drive main unit 31. The cable 34 contains a plurality of signal lines and a plurality of ground lines in an arrangement that the signal lines and the ground lines are alternately arranged from one line to another. This arrangement prevents a signal traveling in one signal line from ingressing into another signal line as a noise.

The embodiment presents the following advantages. Since the switching element 371 is arranged to be exposed out of the external case 33, the user can easily sets the function of the external hard disk drive 3 by simply manipulating the switching element 371. This arrangement frees the user from a troublesome step such as disassembling the external hard disk drive 3.

Since the jumper pins 313A–313I mounted in the hard disk drive main unit 31 are not exposed out of the external case 33, the function of the external hard disk drive 3 is set up without affecting the hard disk drive main unit 31 with static electricity.

Since the switching element 371 is used to select the mode of the external hard disk drive 3 between the master boot mode and the slave boot mode, any of a plurality of external hard disk drives 3 is easily set up for the master boot mode when the plurality of external hard disk drives 3 is connected to the entertainment device 1. This arrangement is particularly useful when the entertainment device 1 contains no internal hard disk drive.

The cable 34 is compliant with the ATA standards, and the interface between the entertainment device 1 and the external hard disk drive 3 is also compliant with the ATA standards. This arrangement eliminates the need for converting an input signal complying with the SCSI standards or other standards into another signal through an IC before inputting the input signal to the hard disk drive main unit 31. The manufacturing cost of the external hard disk drive 3 is thus reduced.

Since the jumper pins 313G and 313H are connected with the switching element 371 through the surge protection circuit containing the varistors 374, a surge current is drained through the ground lines 373 if the surge current flows into the switching signal lines 372 in response to a static electricity. The hard disk drive main unit 31 is thus free from the effect of the surge currents.

The present invention is not limited to the above embodiment, and the following modifications are possible.

In the present embodiment, the switching element 371 has a function to select between the mater boot mode and the slave boot mode in the hard disk drive main unit 31. The present invention is not limited to this arrangement. Alternatively, the external storage device may include a switching element externally exposed out of the case for switching the storage capacity setting function or the standby mode function.

The external hard disk drive 3 is connected to the entertainment device 1 in the above-reference embodiment. The present invention is not limited to this embodiment. The external storage device 3 may be connected to an ordinary personal computer or any other piece of electronic equipment.

The shape and structure of the present embodiment may be changed or modified within the scope of the present invention.

Since, in accordance with the external hard disk drive 3 of the present embodiment, the switch for setting the function of the hard disk drive main unit 31 is exposed out of the case, the function setting on the hard disk drive main unit 31 is performed without disassembling the external hard disk drive 3.

What is claimed is:

1. An external storage device connected to an electronic equipment through a cable, the external storage device comprising:
    a storage device main unit; and
    a switching unit operable to select functions of the storage device main unit, the switching unit including a surge protection circuit.

2. An external storage device according to claim 1, further comprising a case which houses the storage device main unit,
    wherein the switching unit includes a control section for controlling the switching unit, the control section being exposed outside of the case.

3. An external storage device according to claim 1, wherein the switching unit is operable to switch the mode of the storage device main unit between a master booting mode and a slave booting mode.

4. An external storage device according to claim 1, further comprising an interface with the electronic equipment, the interface being compliant with ATA standards.

5. An external storage device connected to an electronic equipment through a cable, the external storage device comprising:
    a storage device main unit; and
    a switching unit operable to select functions of the storage device main unit, the switching unit including a switching element and a surge protection circuit, the switching element being connected to the storage device main unit through the surge protection circuit.

6. An external storage device connected to an electronic equipment through a cable, the external storage device comprising:
    a storage device main unit including a least two jumper pins; and
    a switching unit operable to select functions of the storage device main unit,
    the switching unit including a circuit module operable to switch the functions of the storage device main unit by electrically connecting or disconnecting one jumper pin and the other jumper pin.

7. An external storage device according to claim 6, wherein the circuit module comprises:
    an electric circuit;
    at least two connectors for electrically connecting the electric circuit to the jumper pins; and
    a switching element included in the electric circuit, and
    wherein the circuit module electrically connects or disconnects the one jumper pin and the other jumper pin in response to an on/off operation of the switching element.

8. An external storage device according to claim 7, wherein the circuit module further comprises a surge protection circuit electrically connected to the electric circuit.

9. An external storage device according to claim 8, further comprising a shielding metal case covering the storage device main unit, wherein the surge protection circuit is grounded to the shielding metal case.

10. An external storage device according to claim 7, further comprising a case which houses the storage device main unit,
    wherein the switching unit includes a control section for controlling the switching element, the control section being exposed outside of the case.

11. An external storage device according to claim 7, further comprising a shielding metal case covering the storage device main unit,
    wherein the switching unit includes a control section for controlling the switching element, the control section being exposed outside of the shielding metal case.

12. An external storage device according to claim 7, wherein the connector can be mounted on any of the jumper pins.

13. An entertainment system, comprising:
    an entertainment device; and
    an external storage device connected to the entertainment device through a cable, the external storage device including a storage device main unit and a switching unit operable to select functions of the storage device main unit, the switching unit including a switching element and a surge protection circuit, the switching element being connected to the storage device main unit through the surge protection circuit.

14. An entertainment system, comprising:
    an entertainment device; and
    an external storage device connected to the entertainment device through a cable, the external storage device including a storage device main unit and a switching unit operable to select functions of the storage device main unit, the switching unit including a surge protection circuit.

15. An entertainment system, comprising:
    an entertainment device; and
    an external storage device connected to the entertainment device through a cable, the external storage device including a storage device main unit and a switching unit operable to select functions of the storage device main unit, wherein the storage device unit includes at least two jumper pins, and
    the switching unit includes a circuit module operable to switch the functions of the storage device main unit by electrically connecting or disconnecting one jumper pin and the other jumper pin.

16. An entertainment system according to claim 15, wherein the circuit module comprises:
    an electric circuit;
    at least two connectors for electrically connecting the electric circuit to the jumper pins; and
    a switching element included in the electric circuit, and
    wherein the circuit module electrically connects or disconnects the one jumper pin and the other jumper pin in response to an on/off operation of the switching element.

17. An entertainment system according to claim 16, wherein the circuit module further comprises a surge protection circuit electrically connected to the electric circuit.

18. An entertainment system according to claim 17, further comprising a shielding metal case covering the storage device main unit, wherein the surge protection circuit is grounded to the shielding metal case.

19. An entertainment system according to claim 16, further comprising a case which houses the storage device main unit,
  wherein the switching unit includes a control section for controlling the switching element, the control section being exposed outside of the case.

20. An entertainment system according to claim 16, further comprising a shielding metal case covering the storage device main unit,
  wherein the switching unit includes a control section for controlling the switching element, the control section being exposed outside of the shielding metal case.

21. An entertainment system according to claim 16, wherein the connector can be mounted on any of the jumper pins.

* * * * *

UNITED STATES PATENT AND TRADEMARK OFFICE
CERTIFICATE OF CORRECTION

PATENT NO.    : 6,822,843 B2
DATED         : November 23, 2004
INVENTOR(S)   : Keiji Jitsukawa It is certified that error appears in the above-identified patent and that said Letters Patent is hereby corrected as shown below:

Column 1,
Line 65, "a mast boot" should read -- a master boot --.

Column 3,
Line 64, "an USB" should read -- a USB --.

Column 4,
Line 30, "other type" should read -- another type --.

Column 5,
Line 61, "works depending" should read -- works by depending --.

Column 6,
Line 21, "sets" should read -- set --.
Lines 34 and 35, "disk drives 3 is" should read -- disk drives 3 are --.
Line 53, "response to a static" should read -- response to static --.
Line 67, "above-reference" should read -- above-referenced --.

Column 7,
Line 46, "including a least" should read -- including at least --.

Signed and Sealed this

Tenth Day of May, 2005

JON W. DUDAS
*Director of the United States Patent and Trademark Office*